United States Patent [19]

Cornacchia et al.

[11] Patent Number: 4,466,636
[45] Date of Patent: Aug. 21, 1984

[54] RIGID AXLE SUSPENSION FOR MOTOR VEHICLES

[75] Inventors: Felice Cornacchia; Giuseppe Piritore, both of Turin, Italy

[73] Assignee: Fiat Auto S.p.A., Turin, Italy

[21] Appl. No.: 379,828

[22] Filed: May 19, 1982

[30] Foreign Application Priority Data

Jun. 3, 1981 [IT] Italy .................... 67762 A/81

[51] Int. Cl.³ .......................................... B60G 11/14
[52] U.S. Cl. .................................. 280/724; 280/688
[58] Field of Search ............ 280/673, 688, 724, 725, 280/726

[56] References Cited

U.S. PATENT DOCUMENTS

| 3,163,443 | 12/1964 | Hickman | 280/724 |
| 4,168,086 | 9/1979 | Dick et al. | 280/725 |
| 4,262,929 | 4/1981 | Pierce | 280/725 |
| 4,326,734 | 4/1982 | Kroniger | 280/724 |

FOREIGN PATENT DOCUMENTS

| 497093 | 10/1953 | Canada | 280/673 |
| 813496 | 9/1951 | Fed. Rep. of Germany | 280/688 |
| 1911795 | 9/1970 | Fed. Rep. of Germany | 280/688 |
| 2472487 | 7/1981 | France | 280/688 |

Primary Examiner—Joseph F. Peters, Jr.
Assistant Examiner—Ross Weaver
Attorney, Agent, or Firm—Sughrue, Mion, Zinn, Macpeak and Seas

[57] ABSTRACT

In a motor vehicle suspension comprising a rigid axle (10) provided with attachment members (12,112,18) for pivotally connecting the axle to the support structure (T) of a motor vehicle and to the reaction rods (20), and with support members (14,22,112,26,108) for the rotary support of a pair of wheels (12) and for the support of resilient elements (16) and shock absorber elements (28) of the suspension, both the attachment members and the support members are fixed to the rigid axle solely by mechanical connection means such as screws, bolts, and the like.

5 Claims, 12 Drawing Figures

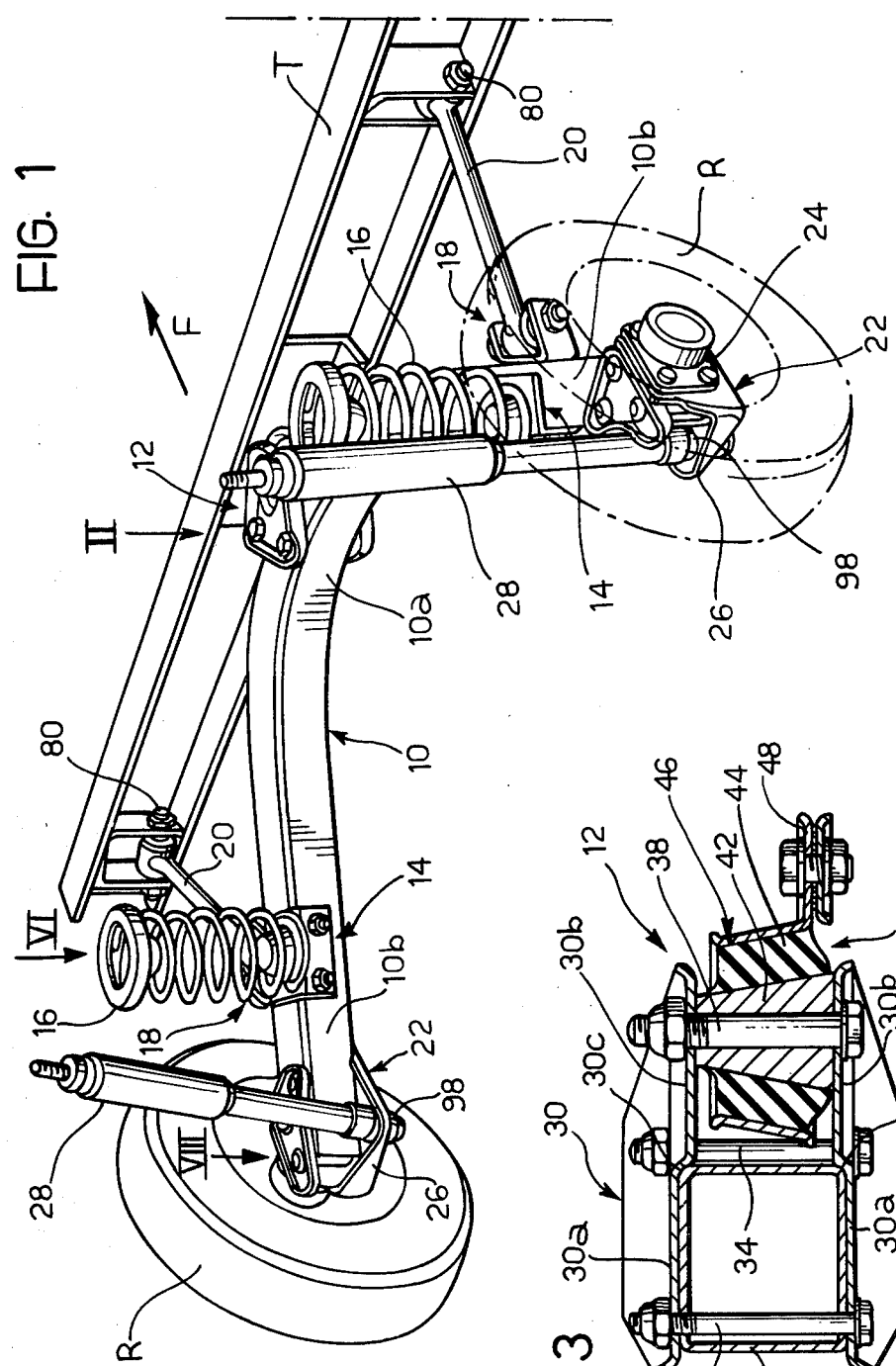

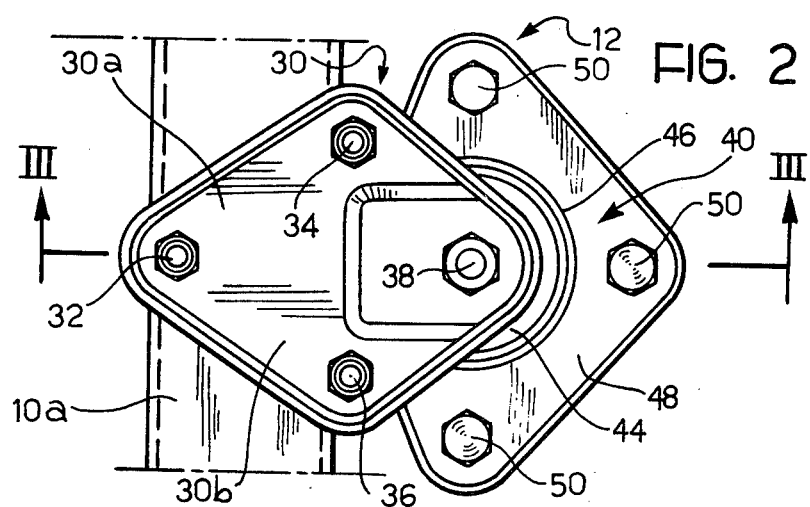
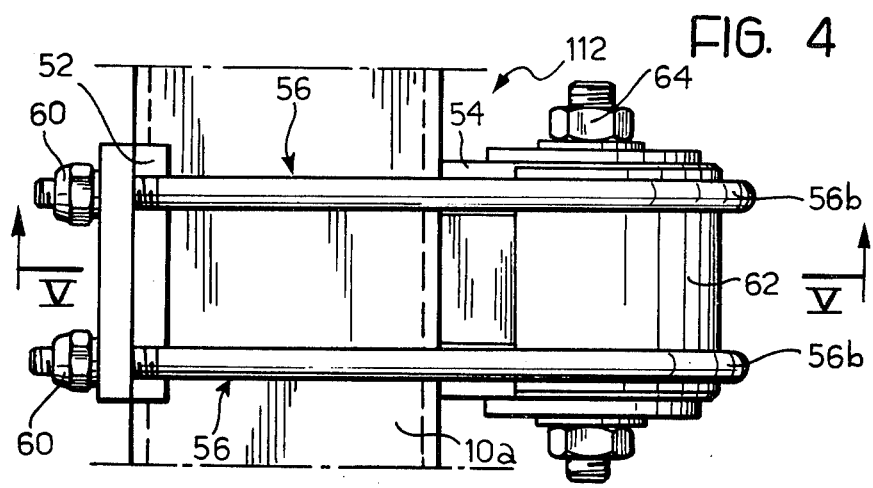
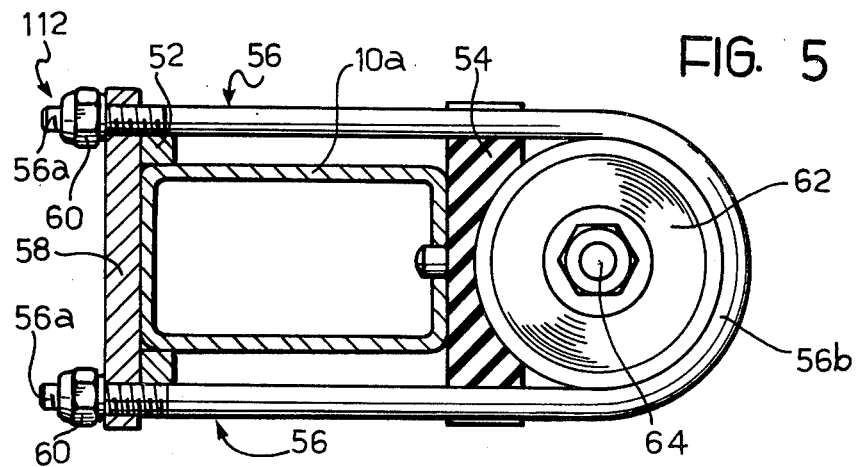

RIGID AXLE SUSPENSION FOR MOTOR VEHICLES

The present invention relates to a rigid axle suspension for motor vehicles, of the type comprising a rigid axle having attachment members for pivotally connecting it to the support structure of a motor vehicle and to possible reaction rods, and provided at its ends with support members for rotatably supporting a pair of wheels which are rotatable about a common axis, and for supporting resilient elements and shock absorber elements of the suspension between the rigid axle and the support structure of the vehicle.

In conventional suspensions of this type, the various attachment and support members are generally fixed to the rigid axle, which can be constituted by a tubular element or open section, by means of welded connections.

This construction involves on the one hand the necessity of making both the rigid axle and the attachment members of a weldable steel, with evident disadvantages tied to the cost and weight of material, and on the other hand the disadvantage of requiring high investments for obtaining the welded connections in an automatic manner.

The object of the present invention is that of obviating such disadvantages by providing a suspension of the type defined above, in which the rigid axle and the associated attachment and support members can be made by using different materials, even non-weldable materials, which are, however, suitable for the attainment of the best characteristics in relation to their specific functions, and which can moreover be assembled together in a relatively simple and economic manner.

With a view to achieving this object, the subject of the present invention is a rigid axle suspension of the type initially described, characterised by the fact that the attachment members are fixed to the rigid axle solely by means of mechanical connection means such as screws, bolts, and the like.

Owing to this characteristic of eliminating any type of welded connection between the axle and the attachment and support members, which can therefore be made of strong materials of a low density, such as, for example, light alloys or composite non-metallic materials, the advantage can be gained of being able significantly to reduce the magnitude of the unsuspended mass of the suspension.

The invention will now be described in detail with reference to the attached drawings, provided purely by way of non-limitative example, in which:

FIG. 1 is a perspective view of a rigid axle suspension according to the invention;

FIG. 2 is a plan view from above and on an enlarged scale of a detail of FIG. 1 indicated by the arrow II;

FIG. 3 is a transverse sectional view taken on the line III—III of FIG. 2;

FIG. 4 is a variant of FIG. 2;

FIG. 5 is a transverse sectional view taken on the line V—V of FIG. 4;

Figure 6:
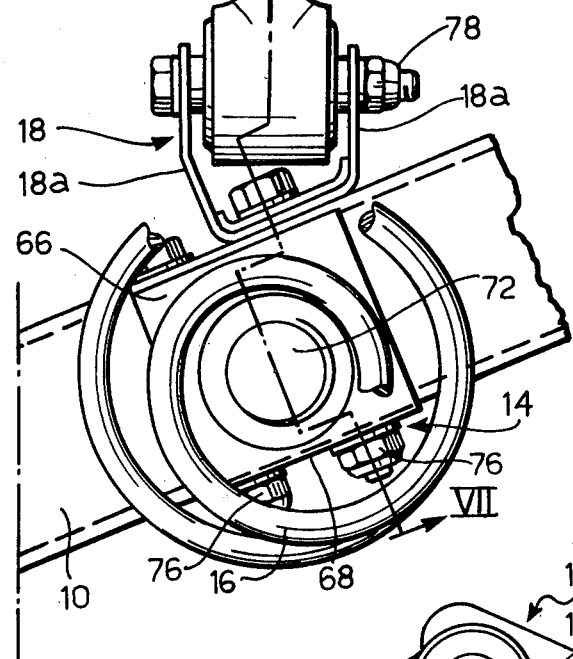
FIG. 6 is a plan view from above and on an enlarged scale of another detail of FIG. 1, indicated by the arrow VI.

The suspension of the invention, illustrated as a whole in FIG. 1, is usable for the rear wheels R of a front-wheel drive motor vehicle. Naturally, the same suspension could be used for both the front wheels and for the rear wheels of a rear-wheel drive motor vehicle.

The suspension includes a rigid axle 10 having a rectangular tubular section and having a curved shape in plan with the convexity facing in the direction corresponding to the direction of forward movement of the vehicle, indicated with the arrow F.

The central part of the axle 10 is connected in an articulated manner, by means of an attachment member generally indicated 12, to a cross-beam T forming part of the support structure of the motor vehicle.

The axle 10 is moreover provided at each of its ends 10b with a support member 14 serving for the support of the lower end of a helical suspension spring 16 and carrying an attachment member 18 for the connection of a longitudinal reaction rod 20, and a support member 22 carrying an element 24 for rotatably supporting a wheel R, and a bracket 26 for carrying the lower end of a shock absorber 28.

Referring in detail to FIGS. 2 and 3, the attachment member 12 includes two horizontal plates 30 having identical substantially lozenge-shaped profiles the edges of which are bent outwardly, and located on opposite sides of the central part 10a of the axle 10. The two plates 30 have a portion 30a in contact with the upper wall and the lower wall respectively of the part 10a, and a part 30b projecting from the axle 10 towards the cross-beam T. The parts 30a and 30b are joined together by inclined portions 30c which abut against corresponding edges of the front wall of the axle 10.

The two plates 30 are clamped to the central part 10a of the axle 10 by means of four vertical bolts 32, 34, 36 and 38 arranged at the corners of the plates 30. In particular, the bolt 32 connects the portion 30a of the two plates 30 and traverses the axle 10 close to its rear wall, whilst the bolts 34, 36 connect the portions 30b adjacent the outer surface of the front wall of the axle 10. The bolt 38, which connects the front ends of the parts 30b, also serves as a retaining member for a resilient support having a vertical axis, generally indicated 40. The resilient support 40 has a generally frusto-conical shape and includes an inner tubular member 42 axially traversed by the bolt 38, an annular block 44 of elastomeric material the inner surface of which is fixed to the outer wall surface of the tubular member 42, and an outer tubular member 46 fixed to the outer surface of the block 44 of elastomeric material. The front panel of the outer tubular member 46 is formed at the bottom into a horizontal attachment bracket 48 fixed by means of a series of bolts 50 to the central part of the cross-beam T.

A variant of the attachment member 12 is illustrated in FIGS. 4 and 5. In this variant, the attachment member, generally indicated 112, includes a pair of vertical plates 52, 54 clamped to the rear wall and the front wall, respectively, of the central part 10a of the axle 10 by means of a pair of U-shaped bolts 56 extending transversely across the axle 10. The two plates 52, 54 engage the axle 10 by respective form couplings and are rigidly secured by means of a reaction plate 58 and four clamping nuts 60 screwed onto the free threaded ends 56a of the two U-bolts 56. Between the front plate 54 and the curved end 56b of the two U-bolts 56 there is interposed a resilient support 62 having a horizontal axis and traversed by a pin 64 serving for fixing to the central part of the cross-beam T. This arrangement has, in comparison with the embodiment illustrated in FIGS. 2 and 3, the advantage of not requiring the formation of through holes in the axle 10.

Figure 7:
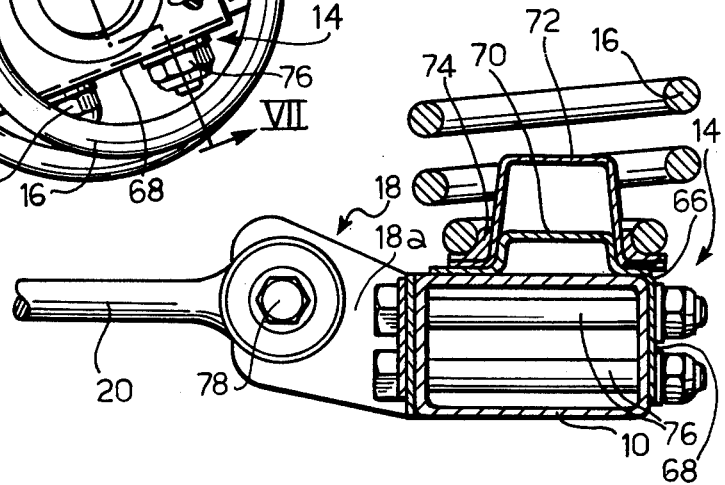
FIG. 7 is a partial transverse sectional view taken on the line VII—VII of FIG. 6.

FIGS. 6 and 7 illustrate in detail one of the support members 14 carried by the axle 10 adjacent its end 10b. The support member 14 is formed by a substantially L-shaped plate having a horizontal branch 66 resting on the upper wall of the axle 10 and a vertical branch 68 adjacent the lateral rear part of the axle itself. The horizontal branch 66 has a central upstanding circular part 70 on which is engaged a member in the form of a cup 72 surrounded by the lower end of the spring 16 which lies, with the interposition of an annular element 74 of elastomeric material, on the peripheral zone of the horizontal branch 66.

The vertical branch 68 is fixed to the axle 10 by means of a pair of superimposed horizontal bolts 76 which traverse the axle 10 and serve, simultaneously for fixing the attachment member 18 to the front wall of the axle itself. This attachment member 18 is constituted by a U-shaped plate projecting towards the cross-beam T and the branches 18a of which support a horizontal pin 78 for the articulation of one end of the corresponding reaction rod 20. As is clearly illustrated in FIG. 1, the other end of the reaction rod 20 is pivotally connected at 80 to the cross-beam T.

Figure 8:
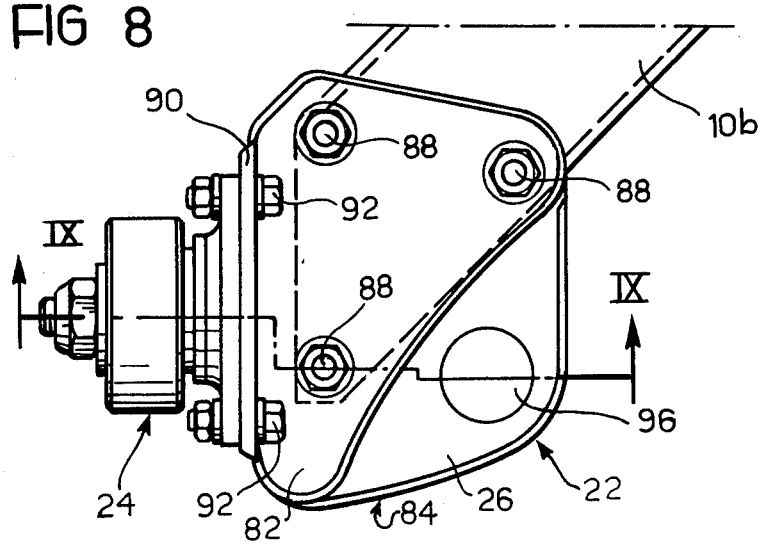
FIG. 8 is a plan view from above and on an enlarged scale of another detail of FIG. 1 indicated by the arrow VIII.
Figure 9:
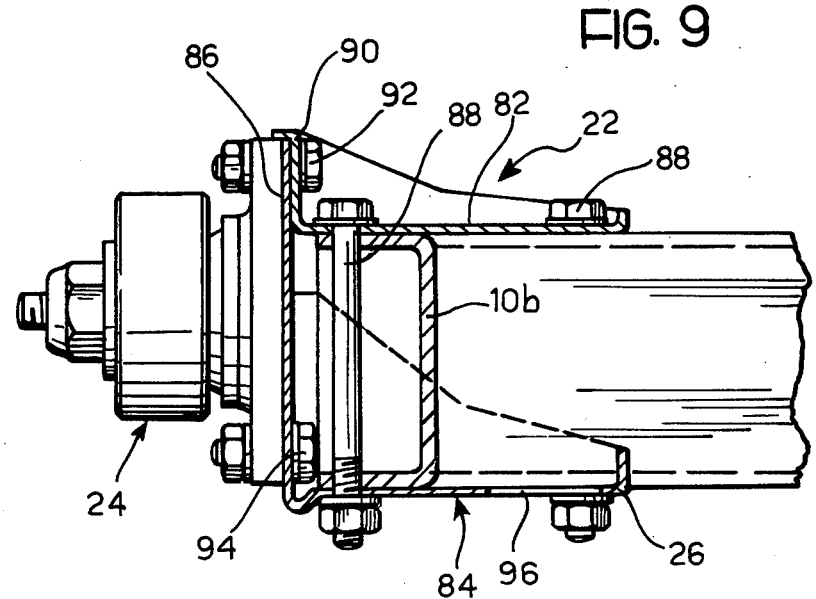
FIG. 9 is a transverse sectional view taken on the line IX—IX of FIG. 8.

FIGS. 8 and 9 illustrate in detail one of the support members 22 fixed to the end 10b of the axle 10. The support member 22 comprises a horizontal upper plate 82 in contact with the upper wall of the end 10b of the axle 10, and a horizontal lower plate 84 in contact with the lower wall of the end 10b and having at its outer side a vertical portion 86. The two plates 82, 84 are clamped together by means of a set of three vertical bolts 88 which pass through the end 10b of the axle 10, whilst the upper part of the vertical portion 86 is connected to a corresponding vertical end flange 90 of the plate 82 by means of a pair of horizontal bolts 92. The bolts 92 are also used (together with a pair of lower bolts 94) to fix the element 24 for the rotary support of the corresponding wheel R to the vertical portion 86. The support 24 is of conventional type and will therefore not be described in detail.

The lower plate 84 also has a horizontal part projecting rearwardly at the end 10b of the axle 10 and constituting the bracket 26. This bracket 26 has a central circular aperture 96 into which engages, with the interposition of a conventional type of annular member 98 of elastomeric material, the lower end of the corresponding shock absorber 28.

Figure 10:
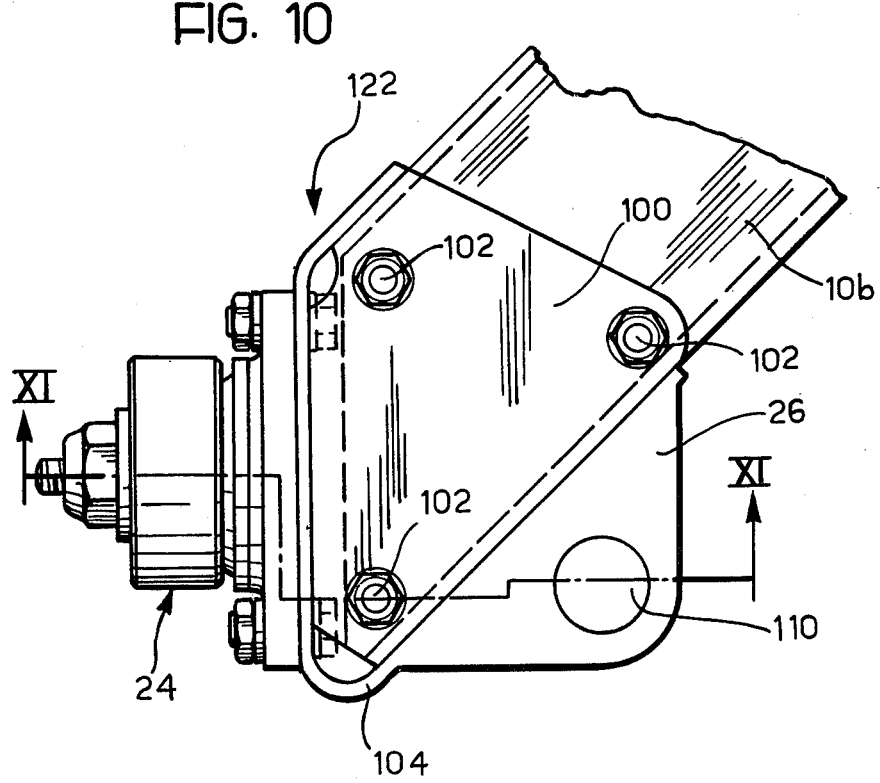
FIG. 10 is a variant of FIG. 8.
Figure 11:
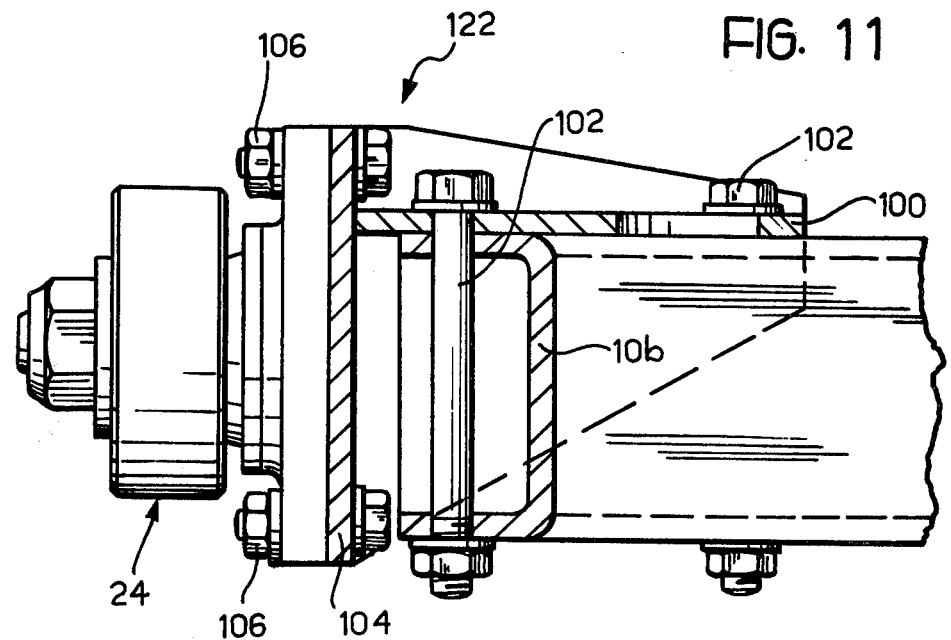
FIG. 11 is a transverse sectional view taken on the line XI—XI of FIG. 10.
Figure 12:
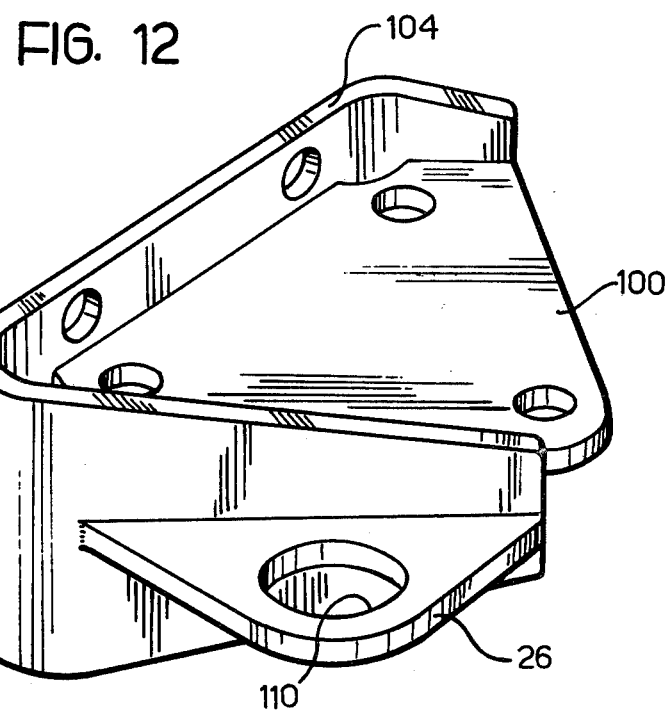
FIG. 12 is a perspective view of a part of FIG. 10 indicated by the arrow XII.

FIGS. 10 and 11 illustrate a simplified variant of FIGS. 8 and 9. In this variant, the support member, indicated generally with the reference numeral 122, comprises only a horizontal plate 100 fitted onto the upper wall of the end 10b of the axle 10 and fixed directly thereto by means of a set of three vertical bolts 102. The outer edge of the plate 100 is connected by welding to a vertical bent plate 104 to which the support 24 is fixed by means of a set of four horizontal bolts 106. A horizontal plate is also fixed by welding to the rear side of the vertical plate 104, this horizontal plate projecting rearwardly at the end 10b and constituting the bracket 26. In this case also, the bracket 26 has a central circular aperture 110 for the insertion of the rear end of the shock absorber 28.

It is apparent from the preceding description that both the attachment members 12 or 112 and 18, and the support members 14 and 22 or 122 are fixed to the axle 12 solely by means of mechanical connections, that is to say, without the use of welded connections. This allows the axle 10 and the associated attachment members and support members to be made from non-ferrous materials, even those which cannot be welded together, such as, for example, light metal alloys and composite non-metallic materials, with consequent advantages relating both to the possibility of reducing the size of the unsuspended mass of the suspension and to the simplicity and economy of manufacture.

Naturally, the principle of the invention remaining the same, the details of construction and the embodiments can be widely varied with respect to what has been described and illustrated, without by this departing from the scope of the present invention.

Thus, for example, the invention can be also applied in the case where the rigid axle has a different configuration from that described and illustrated; for example, an axle constituted by a transverse structural element of any form, with an open or closed cross-section.

We claim:

1. A rigid axle suspension for a motor vehicle having a support structure comprising a rigid axle, attachment means connected to said axle for pivotally connecting said axle to said support structure of said vehicle and support members connected at opposite ends of said axle for supporting a pair of wheels for rotation about a common axis and for supporting resilient elements and shock absorber elements between said rigid axle and said support structure wherein said attachment means includes a pair of parallel vertical form coupling plates disposed in contact with the front and rear sides of said axle respectively, a pair of U-bolts extending transversely of said plates, resilient support means having a horizontal axis interposed between the curved ends of said U-bolts and one of said plates for pivotal securement to said support structure and screw means provided at the free end of said U-bolts clamping the two plates against the axle and for clamping said resilient support means between said U-bolt and one of said plates.

2. A suspension as defined in claim 1, wherein said support members for supporting the resilient suspension elements include, for each end of the rigid axle, a substantially L-shaped plate having a vertical branch and a horizontal branch contacting the upper surface of the axle; a small centring plate for the lower end of the resilient element, carried by said horizontal branch of the plate, and a set of horizontal bolts passing through the axle for fixing said vertical branch of the plate to said axle.

3. A suspension as defined in claim 2, for a motor vehicle having reaction rods connecting the axle to the support structure, wherein the suspension includes a respective fork-shaped attachment plate for the pivotal connection of each reaction rod, said attachment plate being fixed on the side of the axle opposite the vertical branch of said L-shaped plate by said bolts.

4. A suspension as defined in claim 1, wherein said support members for the rotary support of the wheels of the vehicle include, for each end of the rigid axle, at least one horizontal plate fixed to the upper surface of the axle; vertical bolts passing through the axle for fixing said horizontal plate to said axle; a vertical plate connected to the horizontal plate; a support fixed to the vertical plate for the rotary support of a said wheel, and a horizontal bracket carried by said vertical plate and constituting a support member for the lower end of a said suspension shock absorber element.

5. A suspension as defined in claim 4, wherein each of said support members for the rotary support of the wheels of the vehicle further include a horizontal plate which is fixed to the lower surface of the axle by means of said vertical bolts and is rigidly connected to said vertical plate, said horizontal plate having a part projecting rearwardly of the axle and defining said horizontal bracket.

* * * * *